United States Patent
Veres et al.

(10) Patent No.: US 8,442,947 B2
(45) Date of Patent: May 14, 2013

(54) MANAGEMENT OF PERFORMANCE DATA

(75) Inventors: Andras Veres, Budapest (HU); Péter Vaderna, Budapest (HU); Ferenc Kubinszky, Szentendre (HU); Péter Benkö, Budapest (HU); Gergely Szabó, Budapest (HU); Szabolcs Malomsoky, Szentendre (HU); Tamás Borsos, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/002,370

(22) PCT Filed: Jul. 3, 2008

(86) PCT No.: PCT/EP2008/058624
§ 371 (c)(1),
(2), (4) Date: Mar. 25, 2011

(87) PCT Pub. No.: WO2010/000323
PCT Pub. Date: Jan. 7, 2010

(65) Prior Publication Data
US 2011/0173165 A1    Jul. 14, 2011

(51) Int. Cl.
G06F 17/00    (2006.01)

(52) U.S. Cl.
USPC .......................................... 707/661; 707/662

(58) Field of Classification Search .......... 707/660–665, 707/678–686, 778–786
See application file for complete search history.

(56) References Cited

U.S. PATENT DOCUMENTS

| | | | |
|---|---|---|---|
| 6,138,121 A | 10/2000 | Costa | 707/100 |
| 6,327,677 B1 * | 12/2001 | Garg et al. | 714/37 |
| 2002/0052947 A1 * | 5/2002 | Duimovich et al. | 709/224 |
| 2003/0086422 A1 * | 5/2003 | Klinker et al. | 370/389 |

FOREIGN PATENT DOCUMENTS
EP    0 961 439    12/1999

OTHER PUBLICATIONS
International Search Report for PCT/EP2008/058624, mailed Apr. 9, 2009.
Written Opinion for PCT/EP2008/058624, mailed Apr. 9, 2009.

\* cited by examiner

*Primary Examiner* — Wilson Lee
(74) *Attorney, Agent, or Firm* — Nixon & Vanderhye P.C.

(57) ABSTRACT

A method of handling performance data comprising a set of events is described. An event record for each event is stored as a set of blocks, each block containing one or more attributes of the event. The storage space occupied by each event record in is then reduced in discrete steps, each step including a reduction process that reduces the size of one of the set of blocks. This enables the provision of intermediate records between events and counters so that new event records contain complete details of their event, older event records contain less information, and even older event records may contain only high-level (counter) information.

21 Claims, 5 Drawing Sheets

MANAGEMENT OF PERFORMANCE DATA

This application is the U.S. national phase of International Application No. PCT/EP2008/058624, filed 3 Jul. 2008, the entire contents of which is hereby incorporated by reference.

TECHNICAL FIELD

The present invention relates, at least in part, to the management of performance data. In particular, although not exclusively, the invention relates to the aggregation of performance data over time.

BACKGROUND

As telecommunications networks increase in size and complexity, the amount of information processed within such networks has increased dramatically. As a result, the efficient and fast administration and monitoring of this information has become more challenging. As the networks handle more information, the ability to collect, store and monitor performance data for the operation of the network becomes more difficult.

Several nodes In telecommunications networks (such as, for example, a Radio Network Controller in a UMTS radio access network) issue performance data as discrete "events". Such events are stored for further processing, but this is difficult due to the high rate of such events. In order to reduce the demands on storage space, after a predetermined time the events are typically aggregated into counters, and the original events deleted.

In some circumstances, counters are too rigid. This problem has been addressed in some systems by the provision of programmable counters. Communication nodes issue events that are combined into counters according to a programmable logic before they are stored. This approach means that flexible counters can be defined, but suffers from the disadvantage that events are instantly "reduced" to counters as soon as they have issued.

Another proposed system combines the approaches described above. Some events may be stored unchanged, and some may be combined into "transaction records". It is up to the user to delete old data.

Other approaches reduce the storage of counters by skipping those counter values that do not contain significantly different information. Data is often also compressed to reduce storage.

All of the existing solutions struggle to find a balance between the fact that it is beneficial to store detailed event records, but that this requires too much storage space. In some arrangements events are aggregated into counters. These counters lack detailed attributes, occupy very little storage space and can therefore be stored for a long time. The disadvantage of counters is that they cannot be used for fault localization or advanced performance analysis. In some arrangements the data is compressed, but this approach also has its limitations. Some kind of information reduction is inevitable to store network-wide data for long periods of time.

It is therefore an object of the present invention to mitigate the problems presented above. It is further an object of the invention to provide a system for managing performance data to reduce storage space while retaining sufficient information for meaningful performance analysis.

SUMMARY

In accordance with one aspect of the present invention there is provided a method of handling performance data comprising a set of events. An event record for each event is stored as a set of blocks, each block containing one or more attributes of the event. The storage space occupied by each event record in is then reduced in discrete steps, each step including a reduction process that reduces the size of one of the set of blocks.

This enables the provision of intermediate records between events and counters so that new event records contain complete details of their event, older event records contain less information, and even older event records may contain only high-level (counter) information. Thus events, counters and a sequence of performance records that are somewhere in-between events and counters are unified into a common storage format. Using this method, attributes that are important for later analysis can be retained in the performance database for longer than less important attributes.

The set of blocks may comprise one or more of: a time block identifying the point or period in time at which the event took place; a space block containing space attributes of the event; and an information block containing performance attributes of the event. Typical space attributes include node identifiers, addresses, flow identities, path identities, protocol ids, and configuration data. Typical performance attributes include data relating to packet loss, delay, retransmission, protocol error codes, and counter information.

At least one of the steps may include a space block reduction process that reduces the size of the space block. This may be achieved, inter alia, by dropping one or more space attributes from the space block and/or combining one or more space attributes in the space block.

Following the space block reduction it is likely that a plurality of event records will have identical space blocks, in which case those event records can be aggregated. This aggregation may include creating a new event record with a time block which is a union of the time blocks of the aggregated event records and a space block which is the same as the space block of each of the aggregated event records. The information block of the new event record may be an average of the information blocks of the aggregated event records, or may contain performance attributes calculated using a probability density function unifying the performance attributes included in the information blocks of the aggregated event records.

At least one of the steps may include an information block reduction process that reduces the size of the information block. This may result in an information block having fewer performance attributes or simpler data structures.

The operation of the reduction processes may be controlled by a Reduction Model, which may be programmable, that performs the above operations in such a way so that it can be easily customized depending on the system under investigation or the demands of OAM personnel. The process may be helped by automatic procedures, the user only needing to define the reduction functions and the Reduction Model itself, the rest being done by the system automatically.

In accordance with another aspect of the present invention there is provided an apparatus for handling performance data comprising a set of events. A data store is arranged to store an event record for each event as a set of blocks, each of which contains one or more attributes of the event. A processor is operatively connected to the data store and arranged to process each event record in a series of discrete steps. The process at each step acts to so as to reduce the storage occupied by the event record by reducing the size of one of the set of blocks.

BRIEF DESCRIPTION OF THE DRAWINGS

Some preferred embodiments of the invention will now be described by way of example only and with reference to the accompanying drawings, in which.

DETAILED DESCRIPTION

Performance data is stored in a common format, irrespective of the actual level of aggregation. This allows easy handling of different aggregation levels. In one embodiment, performance data is stored as event records in the following record format:

{Time block} {Space block} {Information block}

The time block defines the scope of space and information blocks. The time block may contain either a single point in time (defined, for example, by a year-month-day-hour-min-sec-msec-μsec format) or a time interval defined by two endpoints.

The space block contains attributes related to the performance data known as "space attributes". Space attributes may include (inter alia): node ids, addresses, flow identities, path identities, protocol ids, configuration data etc.

The information block contains performance attributes. Performance attributes hold information about the observed performance related to the time and space attributes. Performance attributes may include (inter alia): packet loss, delay, retransmission, protocol error codes, counter type information etc.

Figure 1:
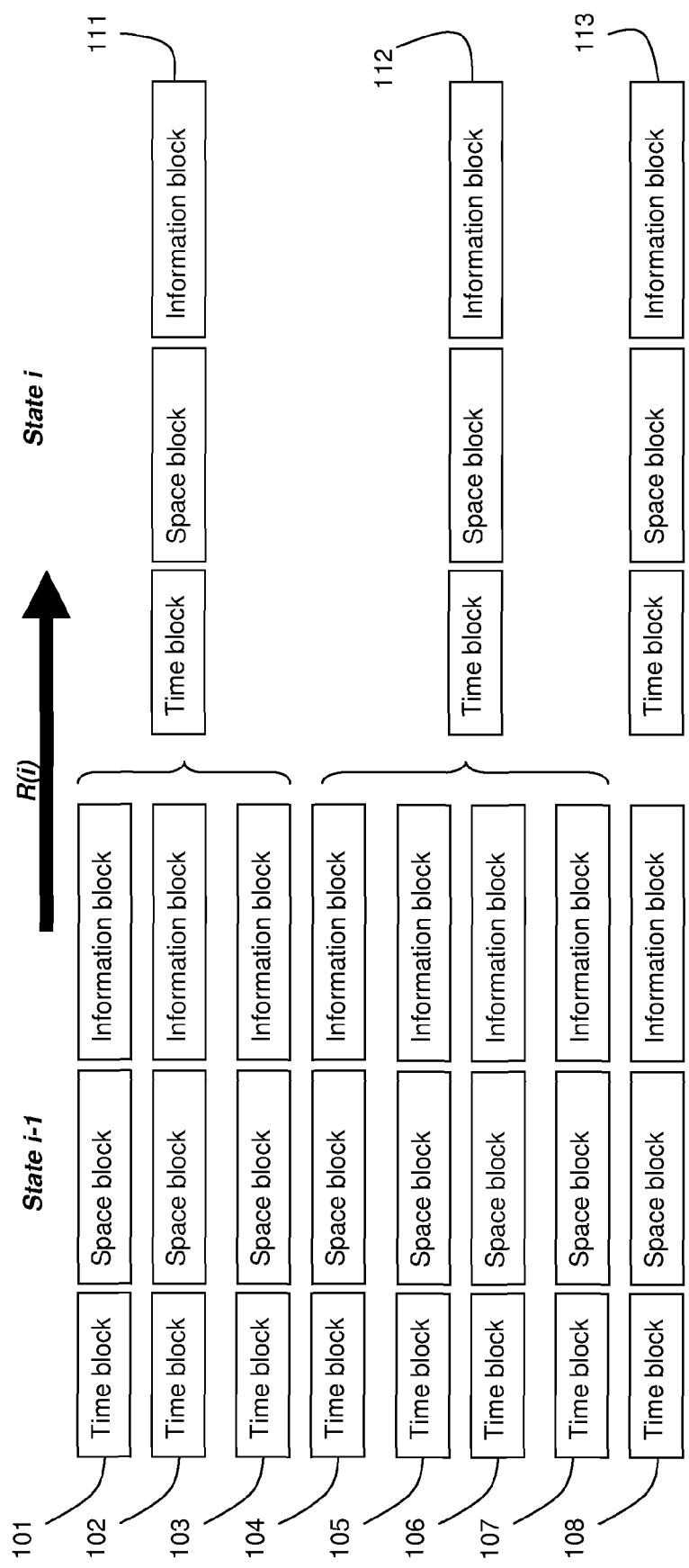
FIG. 1 is a schematic representation of the aggregation of eight event records into three event records.

After its initial production, the data is aggregated in stages, or steps, according to a rule set denoted by R(i), where i represents the iteration or aggregation step. After each step, the database containing performance data is processed according to R(i) and its size will be reduced. The amount of reduction is governed by R(i). This is represented in FIG. 1, which is a schematic illustration of the aggregation of eight event records 101-108 into three event records 111, 112, 113 in aggregation step i.

At each iteration i, the reduction function may operate either as a space block reduction (SBR) or an information block reduction (IBR). Each of these operations is described in more detail below, and results in a reduced database size. The order in which the operations are carried out will depend on the system, and on the type of performance data. It will be appreciated that a skilled expert will be able to design a reduction schedule providing the ideal order of reduction steps which has the optimal balance between reduction of database size and retention of useful information for as long as possible. The order, combination and parameters of space block reduction and information block reduction functions may also be referred to as a "Reduction Model". The reduction model also describes when the iterations commence.

Figure 2:
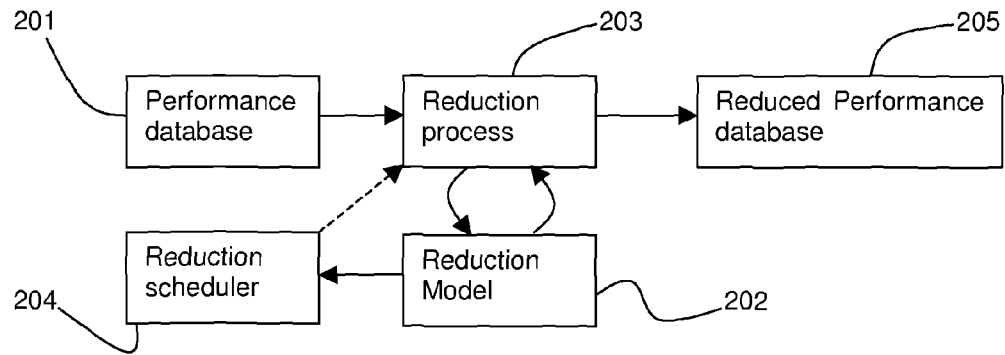
FIG. 2 is a schematic illustration of the interaction between a performance database and a reduction model.

FIG. 2 is a schematic illustration of the interaction between a performance database 201 and reduction model 202. The reduction model 202 determines the operation of the reduction process 203, by defining a reduction scheduler 204 which determines when, and in what order, SBR and IBR functions should be carried out. Once the reduction process has been completed a reduced size performance database 205 will remain. It will be appreciated that the reduced size performance database 205 may itself still be reduced further by an additional reduction model.

Figure 3:
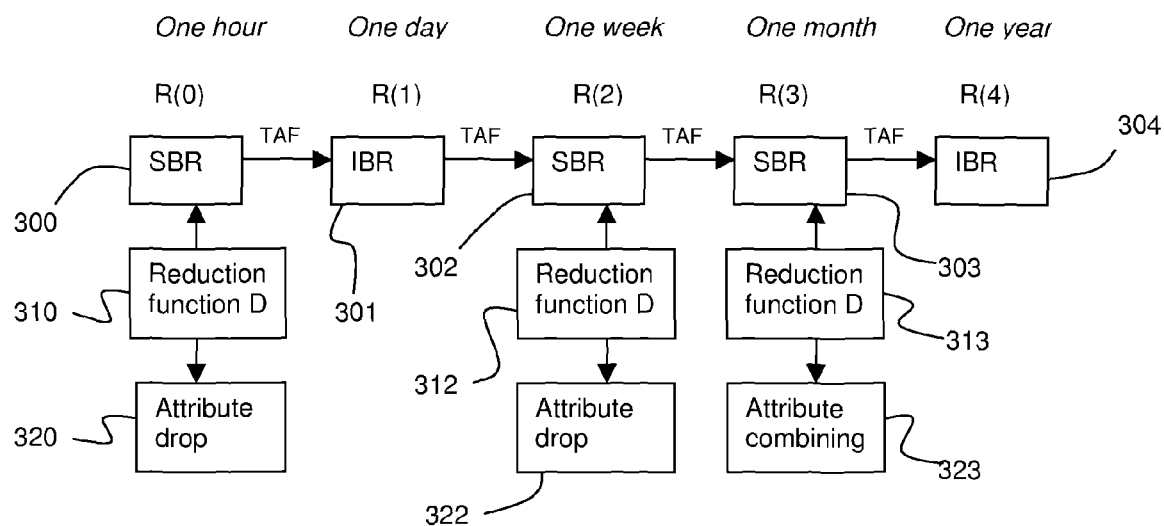
FIG. 3 is a schematic illustration of a reduction model.

The reduction model can be further understood with reference to FIG. 3, which illustrates an exemplary reduction model. Once a performance database has been created, operations are carried out at predetermined time intervals from the creation of each new batch of data. In this example, space block reduction operations 300, 302, 303 are carried out at one hour, one week and one month after the creation of a batch of data. Information block reduction operations 301, 304 are carried out one day and one year after the creation of the batch of data.

One purpose of space block reductions is to reduce the dimensions of the block. In other words, the idea is to reduce the number of attributes stored in the block. Suppose for example that before step R(2) is carried out, the space block contains the following attributes: {user identity, server address, flow identity}. If the Reduction Model requires that a space block reduction is carried out, then one of these attributes will be eliminated using a dimension reduction function 312 called D. In this example, suppose the flow identity is no longer of interest after a week, but the user and server identities are still required in the performance database to be able to locate problems with the server granularity. In this case, the space block reduction 302 uses a dimension reduction function D 312 which, in this case, eliminates the flow identity by dropping the attribute 322. This reduces the dimension of the space block from three to two attributes.

It will be appreciated that the function D can be of many types. Two simple types are described here, attribute drop and attribute combining, but others may also be defined.

In the example of FIG. 3, the reduction functions D 310, 312 carried out after an hour and a week are both attribute drops 320, 322. An attribute drop is a simple operation which eliminates one or more attributes without affecting the other attributes. For example, flow identity can be deleted from the space block as described above.

Figure 4:
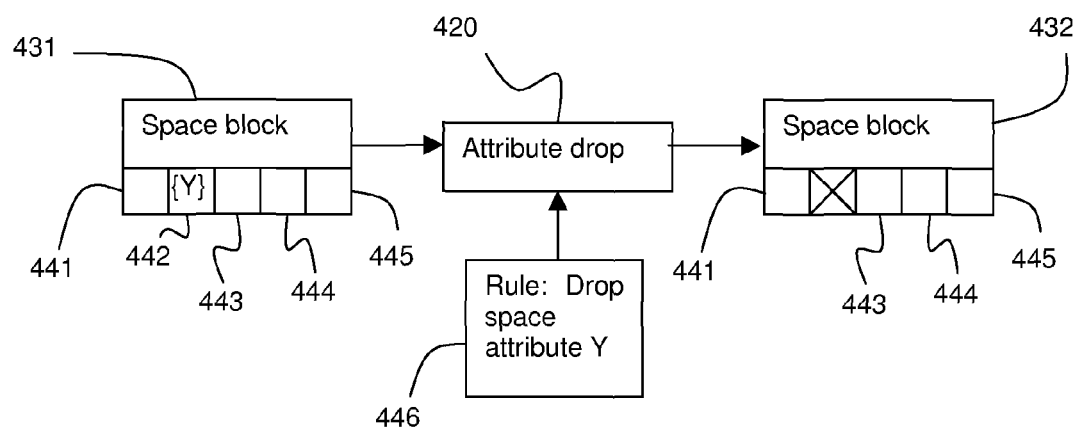
FIG. 4 is a schematic illustration of an attribute drop operation.

Attribute drop is illustrated in FIG. 4. Suppose a space block 431 has five attributes 441-445. An attribute drop 420 is carried out following the rule "Drop space attribute Y" 446. Following the attribute drop 420, a new space block 432 is saved that only has four attributes 441, 443, 444, 445: the space in memory which previously contained attribute {Y} is no longer used. Since the space block 432 now only has four attributes it occupies less memory than it did before the attribute drop 420 took place.

Attribute combining is a more complex operation. In this case a new set of attributes replace the original attributes using some rules. The rules can be defined freely; the only limitation is that the dimension of the space block must be less after the operation. An example of attribute combining is when the user identities and flow identities are combined into a single user-case attribute e.g., "mobile TV user" or "pay-per-view user".

Figure 5:
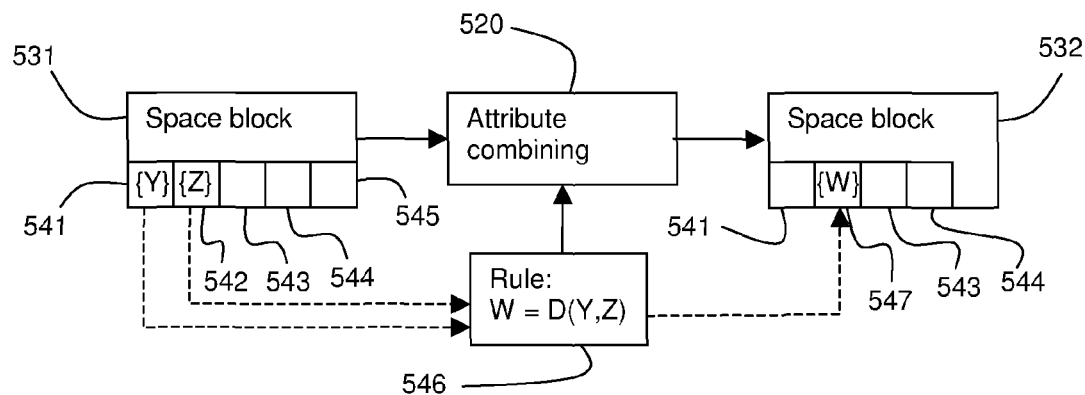
FIG. 5 is a schematic illustration of an attribute combining operation.

Attribute combining is illustrated in FIG. 5. A space block 531 again has five attributes 541-545. An attribute combining operation 520 is carried out using a rule 546 that creates a new attribute {W} which is a combination of attributes {Y} and {Z}. Following the attribute combining operation 520, a new space block 534 is saved which only has four attributes 541, 547, 543, 544 and thus occupies less memory than the old space block 531.

One purpose of Information Block Reduction (IBR) is to reduce the size of the information block. The IBR function converts an information block with a particular combination of information attributes into a new, modified information block which has fewer dimensions, or contains simpler data structures. For example, the statistics of some less important subsystem may be dropped from the Information Block. Another reduction function may replace distribution-type counters with average and/or median values. For example, the distribution may initially represent a number of throughput samples in bins between 100-200 kbps, 200-300 kbps, etc. Following IBR, the reduced value would simply be the average throughput. In a further example, a retransmission counter may be reduced to just "OK" or "NOT_OK" thus reducing the information to 1 bit.

As previously mentioned, IBR and SBR can be used in any order, so that the storage space occupied by each event record is reduced in discrete steps. Their selective use enables important information to be retained while less important information is discarded or aggregated.

One particular benefit of SBR is that it allows a time aggregation of the data, resulting in a reduced size of the database. The time aggregation should be carried out automatically after each SBR step, and is governed by a time aggregation function TAF, which may depend on the type of system or performance data in question.

After an SBR step, a set of event records can be time-aggregated if their space-attributes are equal. The TAF function creates a new event record with a new time block and new information block.

The new time block is a union of input time blocks, because the new record usually covers a larger time interval than the input records. In the simplest embodiment, the new information block may be calculated from a simple average calculation over the input records, but it will be appreciated that in some embodiments the calculation may be as complex as a probability density function unifying the input blocks' information attributes.

Figure 6:
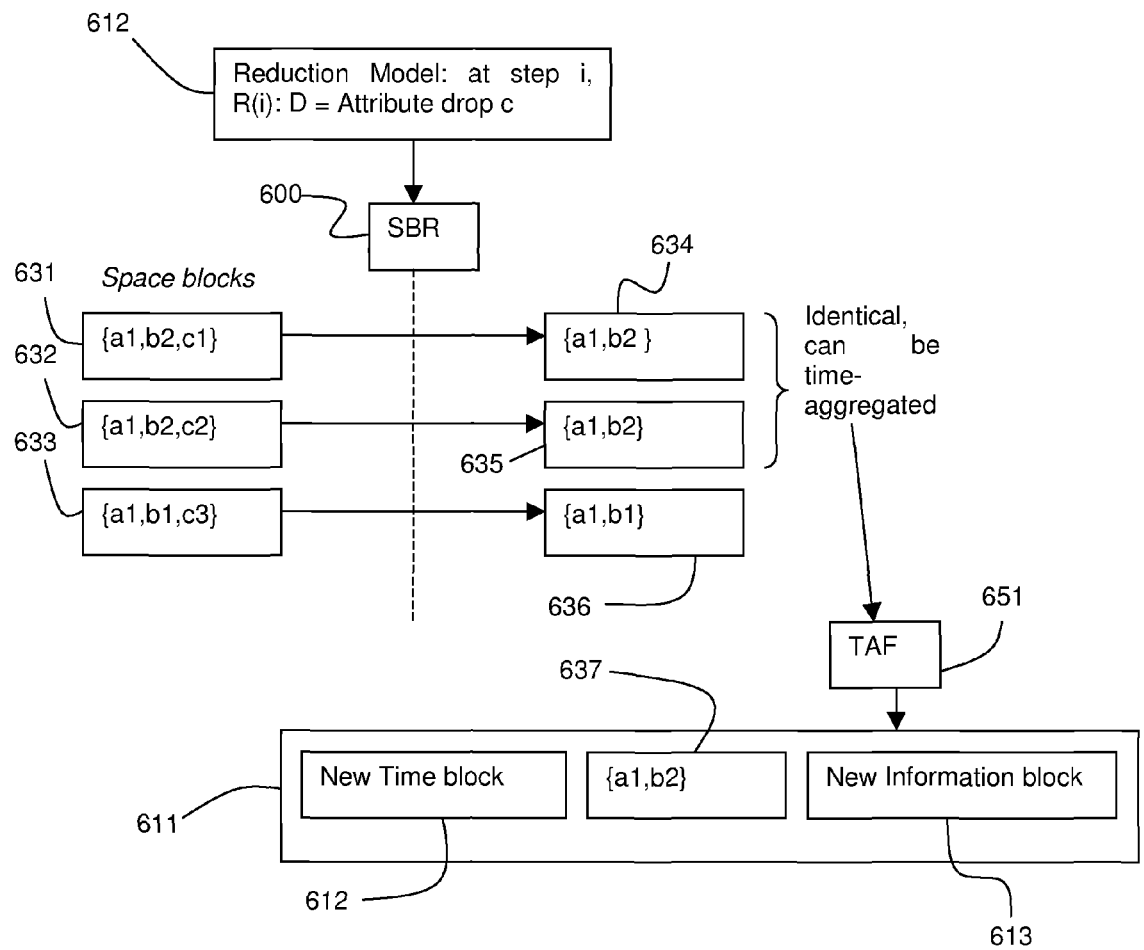
FIG. 6 is a schematic illustration of a time aggregation operation.

The combination of SBR and time aggregation is illustrated in FIG. 6. FIG. 6 illustrates three space blocks 631, 632, 633, each associated with a time block and information block (not shown). Each space block includes three attributes a, b, c. For iteration i, the reduction model R(i) requires that reduction function D is carried out 612. D requires that the attribute c is dropped from the space blocks 631, 632, 633.

Following space block reduction 600, the space blocks 631, 632, 633 are replaced by new space blocks 634, 635, 636, each of which only includes two attributes a, b. Two of the space blocks 634, 635 are now identical since they both hold attributes {a1,b2}. The event records (not shown) containing these two space blocks 634, 635 are aggregated using the time aggregation function 651 into a new event record 611. The new time block 612 of the new event record 611 is a union of the time blocks of the previous event records containing the first two space blocks 631, 632. The space block 637 of the new event record 611 is the same as the two identical space blocks 634, 635 following SBR 600. The data in the new information block 613 is (in this example) calculated as an average of the data in the information blocks of the event records containing the first two space blocks 631, 632.

Figure 7:
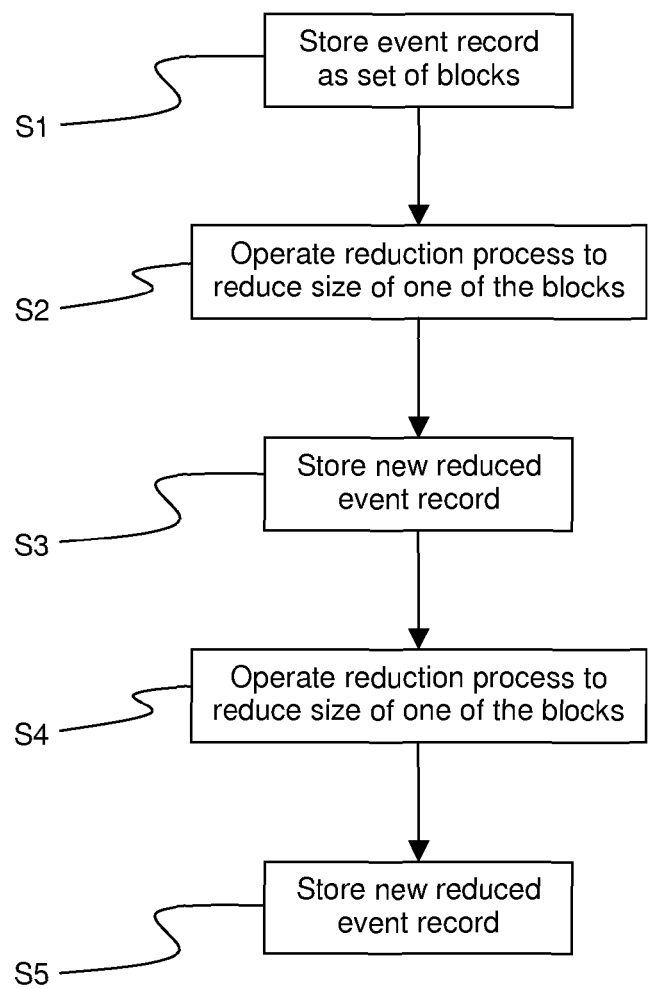
FIG. 7 is a flow diagram illustrating the gradual reduction of stored data.

FIG. 7 is a flow diagram illustrating the gradual reduction of the size of each event record in a series of discrete steps. The event record is initially stored S1 as a set of blocks. A reduction process is operated S2 to reduce the size of the event record by reducing the size of one of the blocks. This results in the storage S3 of a new, smaller event record. A period of time later, another reduction process is operated S4 to reduce the size of one of the blocks. This may be another reduction process acting on the same block as previously, or on one of the other blocks. Another new, reduced even record is then stored S5. These steps may be repeated as often as required, at suitable time intervals, until the event record has been reduced to no more than a counter.

Figure 8:
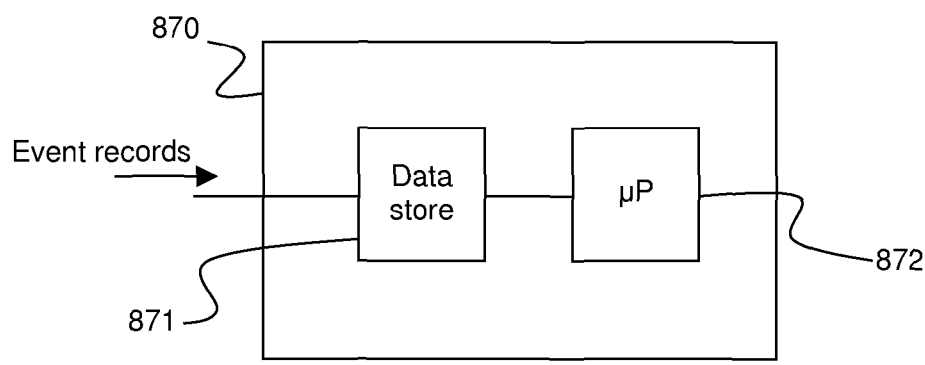
FIG. 8 is a schematic illustration of a node arranged to carry out the data reduction.

FIG. 8 is a schematic illustration of a suitable apparatus 870 for storing and reducing the size of event records. The apparatus includes a data store 871 for storing the event records, each event record being in the form of a set of blocks. A processor 872 is operatively connected to the data store so that it can process the event records in a series of discrete steps by reducing the block sizes.

The approach described above provides great flexibility in handling large quantities of performance data. It enables the provision of a method that can be configured so that the performance management system has access to detailed events and high-level counters, as well as intermediate aggregated data that contains just the amount of information and detail necessary.

This approach also generalises the usage of events and counters and allows their storage in a single performance database together with intermediate performance data.

In one possible embodiment, the final step of reduction may result in exactly those counters that are typically available from communication nodes today, while the intermediate steps allow for tracing service flows across the system to find the location of faults.

As a result of each step of the iteration, the details are reduced in a controlled way allowing less storage space at the price of a more "blurred" picture about the exact details of performance in the past. This way, it is possible for the system maintenance to have a sharp picture about the current (and very recent) state of the network, and a gradually less sharp picture about performance in the past. For example, it may be possible to locate a problem at the link or radio cell level that occurred in the last week, but after a week it may only be possible to locate a problem at the network segment or routing area level. After a month only subsystem or higher level statistics may be available.

It will be appreciated that variations from the above described embodiments may still fall within the scope of the present invention.

The invention claimed is:

1. A method of handling performance data comprising a set of events, comprising:
    storing an event record for each event as a set of blocks, each block containing one or more attributes of the event; and
    reducing the storage space occupied by each event record in discrete steps, each step including a reduction process that reduces the size of one of the set of blocks,
    wherein the set of blocks comprises one or more of:
        a time block identifying the point or period in time at which the event took place;
        a space block containing space attributes of the event; and
        an information block containing performance attributes of the event,
    wherein at least one of the steps includes a space block reduction process that reduces the size of the space block,
    wherein the space block reduction process results in a plurality of event records having identical space blocks, the method further comprising aggregating those event records having identical space blocks, wherein aggregating the event records includes creating a new event record with a time block which is a union of the time blocks of the aggregated event records and a space block which is the same as the space block of each of the aggregated event records, and wherein the new event record has an information block which contains performance attributes calculated using a probability density function unifying the performance attributes included in the information blocks of the aggregated event records.

2. The method of claim 1, wherein the space attributes include one or more of:

node identifiers, addresses, flow identities, path identities, protocol ids, configuration data.

3. The method of claim 1, wherein the performance attributes include data relating to one or more of:

packet loss, delay, retransmission, protocol error codes, counter information.

4. The method of claim 1, wherein the space block reduction process includes dropping one or more space attributes from the space block.

5. The method of claim 1, wherein the space block reduction process includes combining one or more space attributes in the space block.

6. The method of claim 1, wherein the new event record has an information block which is an average of the information blocks of the aggregated event records.

7. The method of claim 1, wherein at least one of the steps includes an information block reduction process that reduces the size of the information block.

8. The method of claim 1, wherein the information block reduction process results in an information block having fewer performance attributes or simpler data structures.

9. The method of claim 8, wherein the information block reduction process includes the replacement of ranges by average and/or median values.

10. The method of claim 1, wherein the operation of the reduction processes is controlled by a reduction model.

11. The method of claim 10, wherein the reduction model is programmable so as to generate an optimum selection and timing of individual reduction processes.

12. The method of claim 1, wherein attributes that are important for later analysis are retained for longer than less important attributes.

13. The method of claim 1, wherein the performance data is performance data of a telecommunications network.

14. A method performed at an apparatus configured to process one or more events generated in a network, the method comprising:

for at least one event, initially storing an event record corresponding to that event in a data store; and at each iteration stage, for at least one event record stored in the data store, performing a reduction process such that an amount of storage space of the data store occupied by that event record is reduced, wherein each event record processed in the iteration stage is an initial event record or an event record processed in a previous iteration stage, wherein each event record in the data store is stored as a set of blocks, each set comprising a time block configured to include a point in time or a time interval at which the event took place, a space block configured to include one or more space attributes of the event, and an information block configured to include one or more performance attributes of the event, and wherein the reduction process performed at each iteration stage is one of a space block reduction process and an information block reduction process, the space block reduction process reducing a dimension of the space block, and the information block reduction process reducing a size of the information block.

15. The method of claim 14, wherein the space attributes include one or more of node identifiers, addresses, flow identities, path identities, protocol ids, and configuration data.

16. The method of claim 14, wherein the performance attributes include data relating to one or more of packet loss, delay, retransmission, protocol error codes, counter information.

17. The method of claim 14, wherein performing the space block reduction process comprises one or both of:

dropping one or more space attributes of the space block; and combining two or more space attributes of the space block into a single space attribute.

18. The method of claim 14, wherein performing the information block reduction process comprises:

reducing a dimension of the information block; and replacing one or more performance attributes of the information block so as to have simpler data structures.

19. The method of claim 14, further comprising:

after performing the space block reduction process, determining whether the space block of the event record is identical to the space block of another event record in the data store; and when it is determined that the space blocks of the event record and of the another event record are identical, creating a new event record in place of the event record and of the another event record, the new event record comprising a new time block, a new space block, and a new information block, wherein the space attributes of the new space block are identical to the space attributes of the reduced event record, and the new time block is a union of time blocks of the reduced event record and of the another event record.

20. The method of claim 19, wherein the new information block of the new event record includes at least one performance attribute represented as a probability density function unifying the performance attributes included in the information blocks event record and of the another event record.

21. The method of claim 14, wherein each event record corresponds to one or more events, and wherein the correspondence between the event record and the one or more events remains the same before and after the reduction process is performed.

* * * * *